US011656912B1

(12) United States Patent
Burgin et al.

(10) Patent No.: US 11,656,912 B1
(45) Date of Patent: May 23, 2023

(54) ENABLING CONDITIONAL COMPUTING RESOURCE TERMINATIONS BASED ON FORECASTED CAPACITY AVAILABILITY

(71) Applicant: Amazon Technologies, Inc., Seattle, WA (US)

(72) Inventors: Joshua M Burgin, Seattle, WA (US); Jacob Adam Gabrielson, Seattle, WA (US); Elton Victor Pinto, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 16/786,656

(22) Filed: Feb. 10, 2020

(51) Int. Cl.
*G06F 9/50* (2006.01)
*G06F 9/455* (2018.01)

(52) U.S. Cl.
CPC .......... *G06F 9/505* (2013.01); *G06F 9/45558* (2013.01); *G06F 9/5077* (2013.01); *G06F 2009/4557* (2013.01); *G06F 2009/45575* (2013.01)

(58) Field of Classification Search
CPC .... G06F 9/505; G06F 9/45558; G06F 9/5077; G06F 2009/4557; G06F 2009/45575
See application file for complete search history.

(56) References Cited

U.S. PATENT DOCUMENTS

| | | | | |
|---|---|---|---|---|
| 7,620,953 B1* | 11/2009 | Tene | ...................... | G06F 9/5077 718/1 |
| 10,042,676 B1* | 8/2018 | Wei | ........................ | G06F 9/5077 |
| 2014/0137110 A1* | 5/2014 | Engle | .................... | G06F 9/5022 718/1 |
| 2014/0372167 A1* | 12/2014 | Hillier | .............. | G06Q 10/06315 705/7.24 |
| 2017/0161117 A1* | 6/2017 | Fukuda | ................. | G06F 9/5083 |

* cited by examiner

*Primary Examiner* — Jacob D Dascomb
(74) *Attorney, Agent, or Firm* — Nicholson De Vos Webster & Elliott LLP

(57) ABSTRACT

Techniques are described for enabling users of a cloud provider network to request the conditional termination of computing resources based on a forecasted availability of replacement capacity at a specified time or range of time in the future. A cloud provider network provides an application programming interface that can be used to make such requests, where the computing resources are hosted by the cloud provider network as part of a capacity pool shared by tenants of the cloud provider network. This type of request can be generated, for example, by a user desiring to terminate the use of some number of unproductive computing resources only if the user can be reasonably assured by the cloud provider network that capacity will be available at a future time when the user will likely need the capacity again.

20 Claims, 9 Drawing Sheets

ENABLING CONDITIONAL COMPUTING RESOURCE TERMINATIONS BASED ON FORECASTED CAPACITY AVAILABILITY

BACKGROUND

Service provider networks have enabled businesses and other organizations to more easily develop, deploy, and scale virtually any type of computing workload using various types of computing resources. Service provider networks provide users with the ability to use, for example, compute resources (for example, by hosting virtual machine (VM) instances or containers, executing batch jobs, executing code without provisioning servers, and so forth), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), and the like.

BRIEF DESCRIPTION OF DRAWINGS

Various embodiments in accordance with the present disclosure will be described with reference to the drawings, in which.

DETAILED DESCRIPTION

Figure 1:
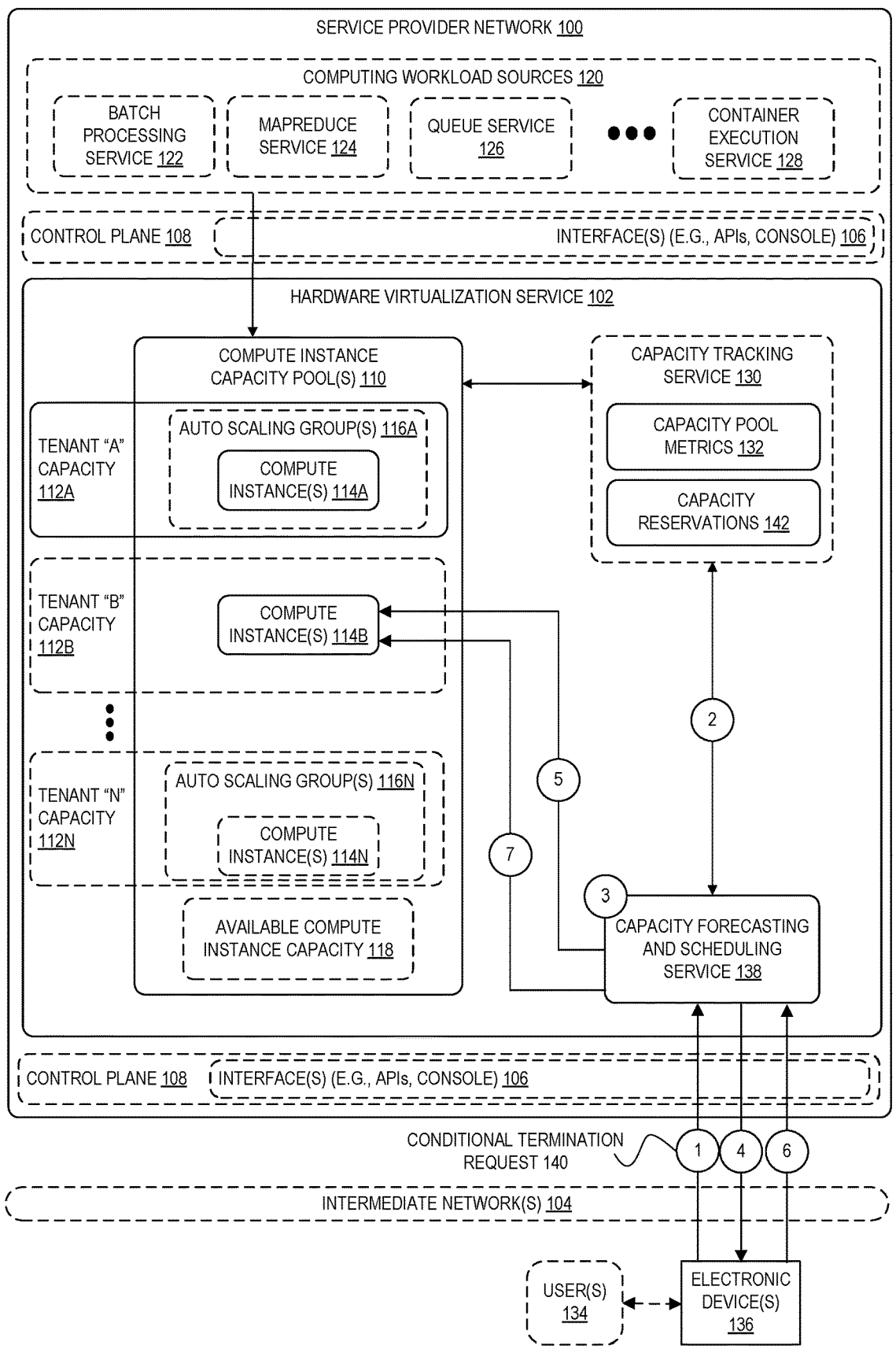
FIG. 1 is a diagram illustrating an environment for enabling requests to terminate computing resource capacity provided by a cloud provider network conditioned on a forecasted likelihood that replacement computing resource capacity will be available at a specified time or range of time in the future according to some embodiments.

The present disclosure relates to methods, apparatus, systems, and non-transitory computer-readable storage media for enabling a cloud provider network to support requests to terminate computing resource capacity provided by the cloud provider network conditioned on a forecasted likelihood that replacement capacity will be available at a specified time or range of time in the future. According to some embodiments, a cloud provider network provides an application programming interface (API) that can be used to request the conditional termination of computing resources (e.g., some number of running virtual machine (VM) instances, container instances, database instances, or the like), where the computing resources are hosted by the cloud provider network as part of a capacity pool shared by a plurality of tenants of the cloud provider network. In some embodiments, the request further specifies a time or range of time in the future at which it is desired to launch one or more computing resources (e.g., 8 hours from the time of the request, or an otherwise specified time in the future). This type of request can be generated, for example, by a user desiring to terminate some number of computing resources only if the user can be reasonably assured by the cloud provider network that replacement capacity will be available at a future time when the user will likely need the capacity again. In other examples, such conditional termination requests can be generated automatically by an "auto scaling" service or any other component of a cloud provider network that automates the scaling of computing resource pools for users of the cloud provider network.

In some embodiments, upon receiving a request to conditionally terminate a computing resource, a cloud provider network generates a forecasted likelihood that capacity will be available at a future time or range of time identified by the request. As described in more detail herein, in some embodiments, a capacity forecasting and scheduling service generates a forecasted likelihood of capacity availability by obtaining historical data reflecting use of a computing resource capacity pool managed by the cloud provider network, where the capacity pool may be shared among any number of tenants of the cloud provider network over time. In some embodiments, assuming the forecasted likelihood of capacity availability at the specified time exceeds a defined likelihood threshold, the capacity forecasting and scheduling service proceeds with terminating the identified computing resources and returns an identifier of one or more capacity reservations that can be used to obtain the requested capacity at the future time. On the other hand, if the forecasted likelihood does not meet the defined threshold, the capacity forecasting and scheduling service does not terminate the existing computing resources and returns a response indicating so. In this manner, users are encouraged to release idle or underproductive capacity back into capacity pools by being provided with assurance that the capacity will be available to those users again at a later time when its use is again expected.

Cloud provider networks have enabled users to more easily develop, deploy, and scale workloads using various types of computing resources. Modern businesses and other organizations that use computing resources provided by a service provider network may often use such computing resources to support many separate computing workloads and development teams that use the available computing resources to various ends. As used herein, a workload refers generally to any type of application, service, or other process to be executed using computing resources provided by a cloud provider network including, for example, software applications, batch jobs, scripts, database workloads, and the like. As one example, consider a business that operates a web-based video streaming service. Operation of the video streaming service might rely on a first workload that implements a website or other type of front-end interface enabling users of the video streaming service to access the video streaming service and to select videos for viewing. The video streaming service might further rely on a periodically executed second workload used to encode available videos into various formats for use by different types of client devices. The business operating the video streaming service might further rely on the periodic execution of various other workloads used to generate financial and other business-related reports, to analyze user statistics, and to perform other ancillary tasks. Each of these workloads execute using capacity obtained from various pools of capacity managed by a multi-tenant cloud provider network across various regions, where the capacity pools are further used in a multi-tenant fashion by many other customers of the cloud provider network at any given time.

As indicated above, many types of workloads associated with customers of a cloud provider network are associated with execution patterns and resource demands that vary over time and that often follow relatively predictable resource demand patterns. For example, the computing resources needed to support the ongoing operation of the example video streaming service might vary widely on a daily and weekly basis depending on when the video streaming service's users typically access the service. In these and many other situations, organizations are often faced with the challenges of ensuring that an appropriate amount of computing resources are available to each of the various workloads and scaling the obtained resources for each workload as demand changes over time.

An organization tasked with obtaining computing resources used to execute a given workload, as in the example of a video streaming service above, might typically obtain a pool of computing resources (e.g., a pool of VM instances) from a cloud provider network's total capacity pool to support the workload. However, due to the cyclical nature of when the video streaming service's customers typically interact with the service, the entire capacity available in the obtained compute instance pool may be fully utilized only on rare occasions and thus many hundreds or thousands of available compute instance hours may go unused on a daily and weekly basis. Although these unused computing resources potentially could be used by the organization's other workloads (for example, to perform encoding tasks, generate business reports and user statistics, and so forth), or by other users of the cloud provider network, users may often allow these resources to remain idle or underproductive to ensure that those resources will be available when needed again. As indicated above, the benefits of elastic computing resource capacity are most fully realized when customers are able to obtain additional capacity when a workload is under a heavier than usual load and able to shed excess capacity when a workload is under a lighter than usual load. However, in part because the available pools of computing resource capacity of a cloud provider network are shared across customers of the cloud provider network, and because the total capacity managed by the cloud provider network ultimately is limited, customers are not always guaranteed the ability to provision any amount of computing resources at any given time. For example, there may be times at which a user desires to provision five hundred new compute instances, but a cloud provider network only has enough infrastructure available to support four hundred new compute instances, and the customer's request may be denied at least in part.

To address these and other issues, according to embodiments described herein, a cloud provider network enables conditional computing resource terminations, as described herein. Among other benefits, the capacity management features of embodiments described herein enable more elastic and efficient use of computing resources available to users of a cloud provider network, thereby reducing computing time (and computing resource usage generally), power usage, and possibly cost incurred by customers of the cloud provider network.

FIG. 1 is a diagram illustrating an environment for enabling requests to terminate computing resource capacity provided by a cloud provider network conditioned on a forecasted likelihood that replacement computing resource capacity will be available at a specified time or range of time in the future according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service 102 that can execute compute instances, a storage service that can store data objects, etc. The users (or "tenants" or "customers") of provider networks 100 may utilize one or more user accounts that are associated with a customer account, though these terms may be used somewhat interchangeably depending upon the context of use. Users may interact with a provider network 100 across one or more intermediate networks 104 (e.g., the internet) via one or more interface(s) 106, such as through use of API calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 106 may be part of, or serve as a front-end to, a control plane 108 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. In FIG. 1, for example, the compute instance capacity pool(s) 110 illustrate example pools of configurable compute resources shared among various tenants of the cloud provider (e.g., represented by tenant "A" capacity 112A, tenant "B" capacity 112B, . . . , tenant "N" capacity 112N, where each tenant has currently provisioned some number of compute instances 114A, 114B, . . . , 114N, respectively, while some amount of available compute instance capacity 118 remains unused in the pools at any given point in time). These resources can be dynamically provisioned and reconfigured to adjust to variable load. In some embodiments, for example, a tenant's resources are optionally associated with or members of one or more auto scaling groups (e.g., auto scaling groups 116A and 116N) such that a collection of resources is treated as a logical grouping for the purposes of automatic scaling and management. In general, cloud computing as described herein can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As indicated above, it is often desirable for users to elastically use computing resources provided by a service provider network 100, where a user obtains additional computing resources as demand grows and terminates computing resources as demand decreases. Consider again an example development team responsible for supporting operation of a video-streaming service. In this example, one or more workloads used to support operation of the video-streaming service typically are in relatively heavy use during the day relative to their largest user base but used less heavily during nighttime hours. The video-streaming service might also be more heavily used during the weekend relative to weekdays. The development team would thus benefit from being able to provision resources during daytime hours and to terminate unproductive resources during nighttime hours. Furthermore, in some examples, since demand for the website fluctuates on a daily and weekly basis, the team has created and associated an auto scaling group with the website workload so that the number of compute instances used to support the website is increased during period of high demand but reduced during off-peak hours when such resources would be otherwise wasted.

Figure 2:
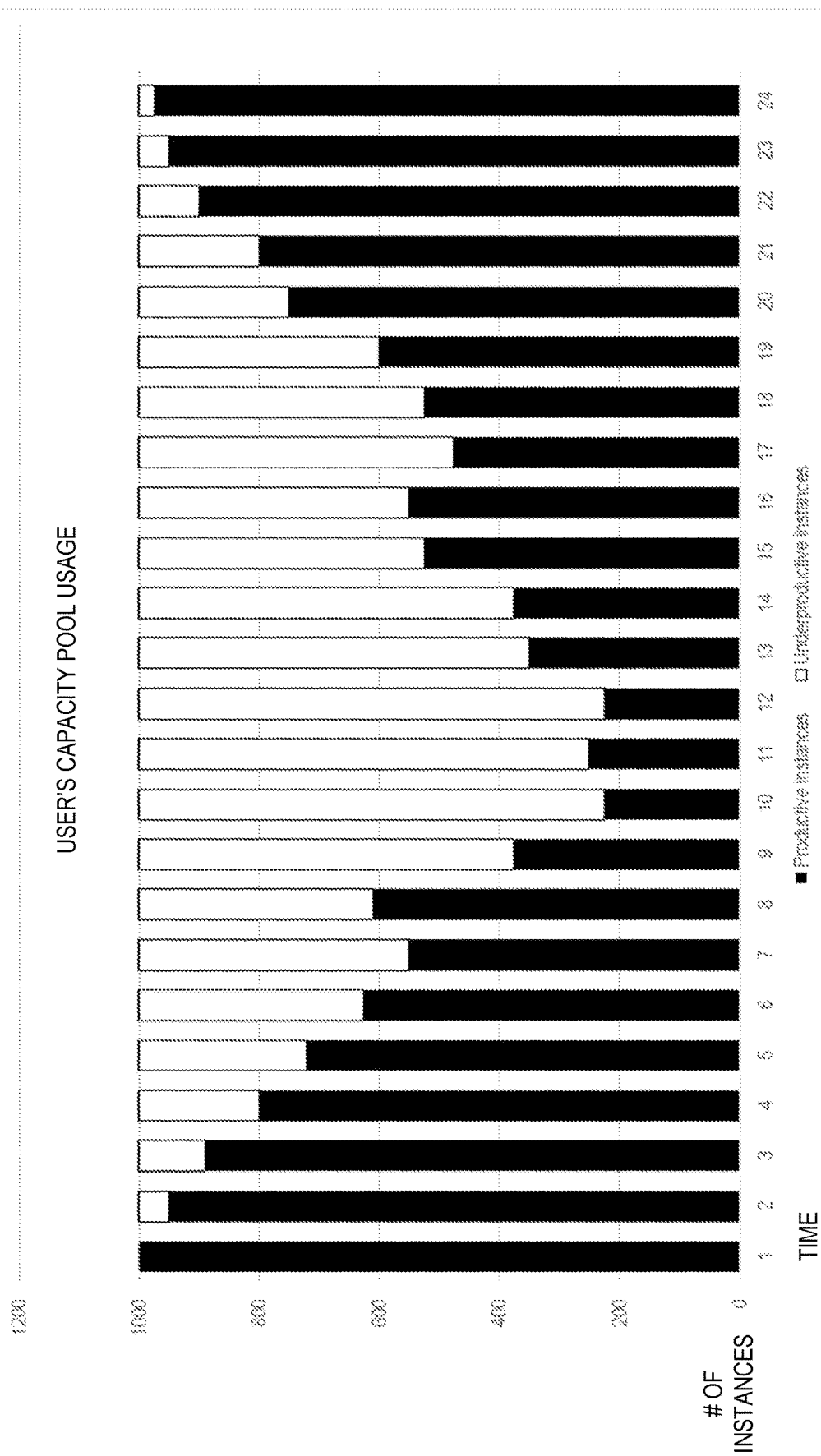
FIG. 2 is a diagram illustrating use of a pool of computing resources by a workload exhibiting a cyclical resource demand pattern according to some embodiments.

FIG. 2 is a graph illustrating a tenant's use of compute capacity to support a cyclical workload over time, as described in the example above. The graph 200, for example, illustrates a tenant's use of a pool of approximately 1,000 compute instances by a workload associated with the user (for example, a workload supporting operation of an organization's website as described above), where each entry on the x-axis corresponds to an hour of day and the height of each black bar in the y-axis represents a number of instances productively used during that hour. As illustrated in graph 200, the example workload uses relatively few compute instances from the compute instance pool during one half of the day (e.g., in the early morning and late evening) but uses nearly the entire available capacity during the other half (e.g., during the middle of the day). The graph 200 illustrates that for such cyclical workloads a significant amount of capacity can go unused or is underproductive each day, which can amount to an even more significant amount of unused capacity over the total period of time for which a pool of compute instances is used to support the workload.

As indicated above, the example shown in FIG. 2 illustrates the use of a pool of computing resources by a workload that is associated with cyclical demand. In this example, the illustrated workload might originate from any of a number of workload sources including, for example, other services of the service provider network 100, a separate workload source created by a user, or any other source of executable software that can make use of computing resources provided by a cloud provider network. Referring again to FIG. 1, example computing workload sources 120 shown include a batch processing service 122, a MapReduce service 124, a queue service 126, a container execution service 128, among any number of other possible workload sources.

As indicated above, one example of a computing workload source 120 is a batch processing service 122. A batch processing service 122 generally enables users to execute queues or batches of compute jobs without manual intervention. In some embodiments, a batch processing service 122 uses other services of a service provider network 100 to execute compute jobs. For example, depending on the specifics of the compute jobs to be executed, a batch processing service 122 can use one or more compute instances provided by a hardware virtualization service 102, execute one or more container instances using a container execution service 128 (which in turn uses compute instances provided by a hardware virtualization service 102), use one or more databases provided by a database service, or use any other types of computing resources or combinations thereof.

A batch processing service 122 enables users to specify various types of compute jobs desired for execution by the batch processing service 122. In response to receiving new compute job requests, the batch processing service 122 uses various processes to plan, schedule, and execute the requested compute jobs by provisioning a quantity and type of compute resources (for example, CPU-optimized or memory-optimized compute instances) based on the estimated resource requirements of the compute jobs submitted. Once execution of requested compute jobs is completed, the batch processing service 122 typically scales down the resources used to execute jobs and awaits receipt of additional compute job requests.

A compute job executed by a batch processing service 122 can include any unit of computing work (such as a shell script, an executable, or a container image) that a user submits to the batch processing service 122 for execution. Each submitted compute job may include configuration information specifying, for example, a name or other identifier of the job, the job's memory and processing requirements, and an identifier of a location where the compute job is located (for example, a location of a shell script, executable, or container image). In some examples, compute jobs submitted to a batch processing service 122 can be executed as containerized applications running on compute instances in a defined compute environment. Compute jobs can also reference other jobs by name or by identifier and can be dependent on the successful completion of other jobs. A compute job can be described using a job definition, which describes the job to be executed including any parameters, environmental variables, compute requirements, and other information that is used to execute a compute job. Referring to FIG. 1, in some instances, compute jobs submitted to a batch processing service 122 (for example, using a web-based console or other interface provided by the service) can be executed as one or more workloads using one or more compute instances of a compute instance pool 110.

In some embodiments, another example of a computing workload source 120 is a queue service 126. A queue service 126, for example, can be used to create queues of compute jobs or other types of computing workloads that similarly can be executed using compute instances of a compute instance pool 110. Other examples of workload sources include a MapReduce service 124 and container execution service 128, each of which similarly can be configured to carry out various types of workloads (for example, MapReduce jobs or container executions) using compute instances from compute instance pool(s) 110. In some embodiments, the compute instance capacity pool(s) 110 can each include different types of compute instances, where each pool is associated with a different balance of compute, memory, and networking resources.

As indicated above, the compute instances of a compute instance capacity pool 110 used by one or more of the tenants of the cloud provider network can be associated with or be a member of one or more respective auto scaling groups—for example, auto scaling group 116A may be associated with a first tenant's workload, and auto scaling group 116N may be associated with another tenant's workload. In some embodiments, an auto scaling group defines a logical pool, or fleet, of compute instances that may share similar characteristics and can be treated collectively for the purposes managing and scaling the group of instances. For example, if a workload executes across multiple instances of an auto scaling group 116A, it may be desirable at times to increase the number of instances in that group to improve the performance of the workload or to decrease the number of instances to reduce costs when demand is low (as illustrated by the example shown in FIG. 2). As further indicated above, an auto scaling group can be associated one or more auto scaling policies that define conditions for automatically scaling up or scaling down the number of instances available in the group. To enable such scaling, in some embodiments, some or all of the compute instances of a compute instance pool 110 can be configured to collect and to send various performance metrics that enable a scaling process to determine when to scale the size of a corresponding auto scaling group, for example, by comparing the obtained metrics to one or more corresponding auto scaling policies.

Furthermore, in some embodiments, a capacity tracking service 130 of the hardware virtualization service 102 monitors the use of compute instance capacity pool(s) 110 by tenants of the cloud provider network. The capacity tracking service 130, for example, maintains capacity pool metrics 132 that may indicate some or all of: a maximum number of compute instances that can be provisioned in each compute instance capacity pool (where such statistics may be maintained for each region and/or availability zone provided by the cloud provider network), a number of currently provisioned compute instances in each capacity pool, an amount of "reserve capacity" available in each capacity pool (e.g., compute instances are reserved only for emergency situations), historical data reflecting the various capacity metrics over time, information about amounts of capacity to be added or removed from each capacity pool at future times (e.g., to balance capacity among overstocked and understocked capacity pools), and so forth. In some embodiments, a capacity tracking service 130 provides an API that enables other services, such as a capacity forecasting and scheduling service 138, to obtain information about current and historical capacity levels.

In FIG. 1, one or more workloads (for example, workloads associated with tenants 112A, 112B, . . . 112N) are executed using compute resources (for example, VMs, containers, standalone servers, or any other type of compute capacity) provided by a hardware virtualization service 102 or other service and obtained by a user or service of the service provider network 100. As shown in FIG. 1, each of the workloads executes on some number of compute instances of the hardware virtualization service 102 (for example, a tenant A's workload(s) run on compute instance(s) 114A, a tenant B's workload(s) run on compute instance(s) 114B, and a tenant N's workload(s) run on compute instance(s) 114N, while available compute instance capacity 118 represents compute instances presently unused by any particular workload). In this example, each compute instance of the compute instance pool 110 can host a separate instance of a respective workload, for example, as a separate instance of a corresponding application or other executable running on a VM or container instance, or host entirely separate workloads. In some embodiments, the compute instances executing a workload can be hosted on any number of computing devices—for example, each of the compute instance(s) 114A can be hosted by a separate computing device or, in some cases, a same computing device can host two or more compute instances 114A. As described above, the number of compute instances used for one or more of the workloads initially can be selected and provisioned based on expected resource demands for each of the separate workloads.

In some embodiments, a service provider network 100 offers a variety of compute instance types each having different resource capacities, and a type of compute instance used various workloads can be selected further based on an expected type of workload. For example, compute instances associated with greater CPU capacity can be provisioned for a more CPU-intensive workload, while compute instances associated with greater GPU capacity can be provisioned for a different workload that is typically more GPU-intensive. Although only a single compute instance pool 110 is shown in FIG. 1, a service provider network 100 may provide any number of separate compute instance capacity pools across various regions, each possibly associated with different types or amounts of compute instances or other computing resources.

In some embodiments, some of all the compute instances of a compute instance pool 110 are configured to periodically emit or otherwise send various performance metrics to a data monitoring service of the service provider network 100. A data monitoring service collects monitoring and operational data in the form of logs, metrics, and events, related to virtually any type of computing resource of a service provider network 100. In some embodiments, metrics collected by a data monitoring service from compute instances of various compute instance pools 110 can be used by a capacity tracking service 130 and capacity forecasting and scheduling service 138 to determine an amount of compute capacity from compute instance pool(s) 110 used by each of various workloads (for example, workloads associated with tenants A-N) over time and to make predictions about future resource usage patterns by various workloads and tenants. In some embodiments, metrics may be collected and stored separately for each workload, for example, where each workload can be associated with a separate "namespace" used to identify the workload's metrics by a capacity tracking service 130 and capacity forecasting and scheduling service 138.

In some embodiments, at the circle labeled "1" in FIG. 1, a user 134 uses one or more electronic device(s) 136 to generate and send a request 140 to conditionally terminate one or more compute instances running as part of a compute instance capacity pool 110 shared by tenants of a cloud provider network 100 (e.g., a tenant B might request to conditionally terminate one or more compute instances 114B that are part of a pool of capacity provided by the hardware virtualization service 102 for any number of tenants). In some embodiments, the request further indicates a future time or range of time at which it is desired to launch one or more new compute instances to be used to replace the compute instance(s) being terminated. For example, a user 134 may interact with a capacity forecasting and scheduling service 138 of a hardware virtualization service 102 via a web-based console, command-line interface, or other provided interface. In other examples, a conditional termination request is generated by an auto scaling service managing the use of compute instances (e.g., managing auto scaling groups 116A and 116N). In yet other examples, a user 134 can enable another service of the service provider network 100 to generate conditional termination requests for compute instances supporting one or more workloads via a separate service of the service provider network 100 and that may be integrated with the capacity forecasting and scheduling service 138 (for example, via an interface associated with a batch processing service 122, container execution service 128, or any other service that is able to make use of capacity provided by a compute instance pool 110 or other pool of computing resources). In the example of a request generated by another service or application, a future time or range of time included in the request may be based on an analysis of historical resource demand data reflecting use of computing resources by a workload associated with the compute instance(s).

In some embodiments, a capacity forecasting and scheduling service 138 manages various aspects of how capacity available in a compute instance pool 110 is allocated (or how pools of other types of computing resources are allocated). As one example, a user 134 can use an interface associated with a capacity forecasting and scheduling service 138 to view historical data related to the use of compute instances in a user's compute instance pool over time, determine that excess compute instances in the compute instance pool are periodically available for use (for example, as illustrated by the example of FIG. 2), and provide input indicating a desire to conditionally terminate compute instances at periods of relatively low utilization.

In some embodiments, a capacity forecasting and scheduling service 138 can also assist users by automatically identifying workloads that may be well-suited for use of conditional compute instance terminations. For example, a capacity forecasting and scheduling service 138 can analyze workload metrics or use other processes to identify auto scaling groups or workloads that exhibit cyclical resource demand patterns which often result in periods of available or unproductive capacity. In this example, a capacity forecasting and scheduling service 138 can provide and cause display of a graphical user interface (GUI) that indicates an amount of compute instance pool capacity used by the identified workloads over time, including an indication of what types of compute instances are available and at what times such instances are typically available for use by other workloads, and further include a suggestion that conditional termination requests be used in connection with the workloads. In some embodiments, the capacity forecasting and scheduling service 138 can further identify, for one or more existing auto scaling groups or workloads, other auto scaling groups or workloads that are associated with capacity usage patterns that align with the auto scaling group or workload in such a way that capacity could be shared efficiently (for example, an auto scaling group that typically scales out during the day and scales down at night can be matched with one or more other auto scaling groups that typically scale out at night and scale down during the day).

Figure 3:
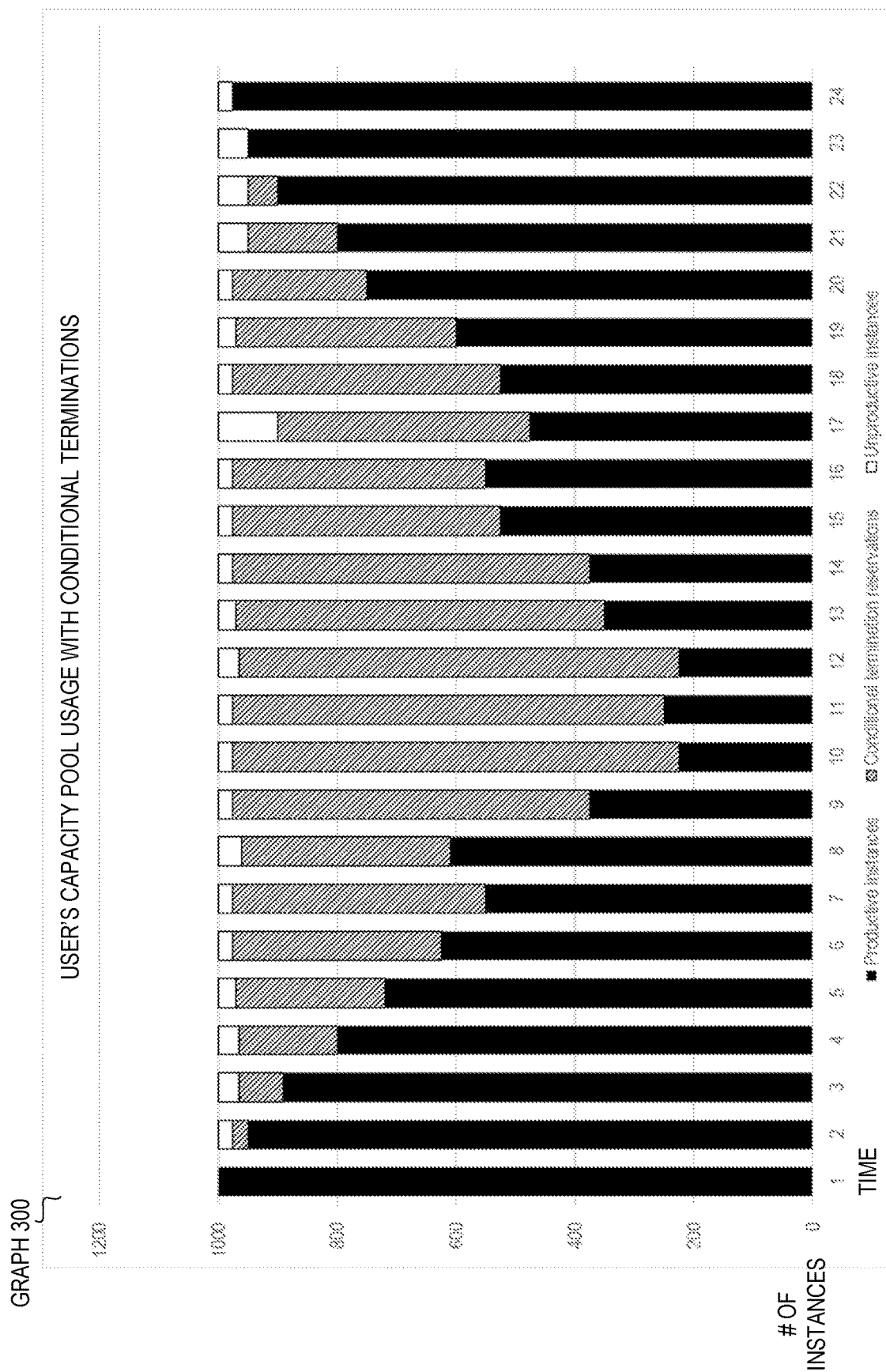
FIG. 3 is a diagram illustrating the use of conditional termination requests and corresponding capacity reservations to manage use of a pool of computing resources by a workload exhibiting a cyclical resource demand pattern according to some embodiments.

FIG. 3 is a diagram illustrating the use of conditional termination requests and corresponding capacity reservations to manage use of a pool of computing resources by a workload exhibiting a cyclical resource demand pattern according to some embodiments. FIG. 3 is similar to FIG. 2 in that it illustrates a number of compute instances of a pool of approximately 1,000 compute instances used by a workload over a 24-hour period, illustrated by the dark bars in the graph 300. The example shown in FIG. 3 further illustrates that compute instance reservations are being obtained, depicted by the bars with horizontal bars, responsive to requests for the conditional termination of compute instances from the capacity pool.

As illustrated in FIG. 3, throughout the day some number of instances remain unproductive, either because the service provider is unable to satisfy a total number of conditional termination requests or because a user associated with the pool desires to maintain some buffer of instances that can be used immediately. As further illustrated, as the day progresses and additional resources are needed in the later hours, the user exchanges some number of their capacity reservations for additional instances to be used as demand again increases. Compared to FIG. 2 however, the workload illustrated in FIG. 3 is associated with significantly fewer unproductive instances throughout the day, and those terminated instances can be used by other workloads of the tenant or by workloads of other tenants in a more productive manner.

In some embodiments, at circle "2" in FIG. 1, in response to receiving a request for the conditional termination of one or more compute instances, a capacity forecasting and scheduling service 138 obtains historical capacity data for a compute instance capacity pool with which the instance is associated for one or more past time windows. The capacity forecasting and scheduling service 138 can be configured to obtain the capacity metrics from a capacity tracking service 130 on a periodic basis or in response to a request to measure a current workload or compute instance pool 110 status.

In some embodiments, at circle "3," the capacity forecasting and scheduling service 138 determines, based at least in part on the historical data obtained from the capacity tracking service 130, whether the conditional termination request can be satisfied. In some embodiments, a capacity forecasting and scheduling service 138 generates a value indicating a forecasted likelihood of the cloud provider network's capacity pool with which the compute instances are associated having sufficient capacity available to launch the new compute instance at the time or range of time in the future specified by the request. In some embodiments, the capacity forecasting and scheduling service 138 optionally provides users with suggested ranges of time during which the capacity forecasting and scheduling service 138 has determined a likelihood value that exceeds a defined threshold (e.g., to indicate that the service has predictive certainty up to 8 hours, or a month, or however long is determined based on the obtained historical data). In some embodiments, the generation of a likelihood value depends on some or all of: the number of compute instances for which conditional termination is requested, a total number of compute instances in the associated capacity pool, a current number of compute instances in the associated capacity pool used by tenants of the cloud provider network, historical data reflecting usage of the capacity pool over time, a number of current capacity reservations for the capacity pool associated with tenants of the cloud provider network, an amount of variability in the usage of the associated capacity pool, an amount of time in the future for which a likelihood value is requested, an amount of capacity to be added to the capacity pool at one or more future times, an amount of capacity to be removed from the capacity pool at one or more future times (e.g., for purposes of rebalancing the capacity pools), a predictive certainty that can be obtained based on an amount of time in the future for which the prediction is requested.

In some embodiments, a capacity forecasting and scheduling service 138 can generate predictions of compute instance pool capacity usage using any of a variety of different techniques including autoregressive models, machine learning (for example, based on recurrent neural networks (RNNs) or other time series forecasting models), or other forms of predictive modeling and probabilistic forecasting known to those of skill in the art. In some embodiments, a capacity forecasting and scheduling service 138 uses a separate machine learning (ML) service of the service provider network 100 to create ML-based models of capacity usage of various compute instance capacity pools 110. The training of such models, for example, can be based on using windows (e.g., 2 weeks) of historic time series data, where the models can be updated over time (or completely regenerated) as more data becomes available. In some embodiments, capacity usage predictions can be probabilistic and used to provide users with an indication of how likely future scheduled uses of compute capacity are to be satisfied based on historic trends.

In some embodiments, at circle "4," the capacity forecasting and scheduling service 138 sends a response to the requesting electronic device 136 (or to the requesting service or other application) indicating whether the request can be satisfied based on the analysis performed at circle "3." In some embodiments, the response indicates whether the capacity forecasting and scheduling service 138 can satisfy the conditional termination request based on whether a generated value indicating a forecasted likelihood of the associated capacity pool having sufficient capacity to launch replacement computing resources at the future time or range of time requested by the user exceeds a defined threshold value. The threshold value may be defined by the service provider network 100 or by a user with which the request is associated (e.g., the service provider network 100 may satisfy the request only if the calculated value exceeds 80%, 85%, 90%, or 95%, or any other percentage value determined by the cloud provider to indicate a desired likelihood of the user being able to relaunch, or the user may specify a likelihood threshold as part of the initial request).

In some embodiments, assuming that the value indicating the forecasted likelihood exceeds a defined threshold, the response includes an identifier of a reservation for the capacity at the future time, where information about capacity reservations is stored as capacity reservations 142 by the capacity tracking service 130 or other component of the hardware virtualization service 102. In some embodiments, for each capacity reservation, the capacity reservations 142 data indicates some or all of: an identifier of the capacity reservation, a time at which the capacity reservation was generated, at future time or range of time for which the capacity reservation is valid, and an indication of whether the capacity reservation has been claimed. In some embodiments, at circle "5," the capacity forecasting and scheduling service 138 (or another component of the hardware virtualization service 102) terminates the requested instances assuming the request is satisfied.

Figure 4A:
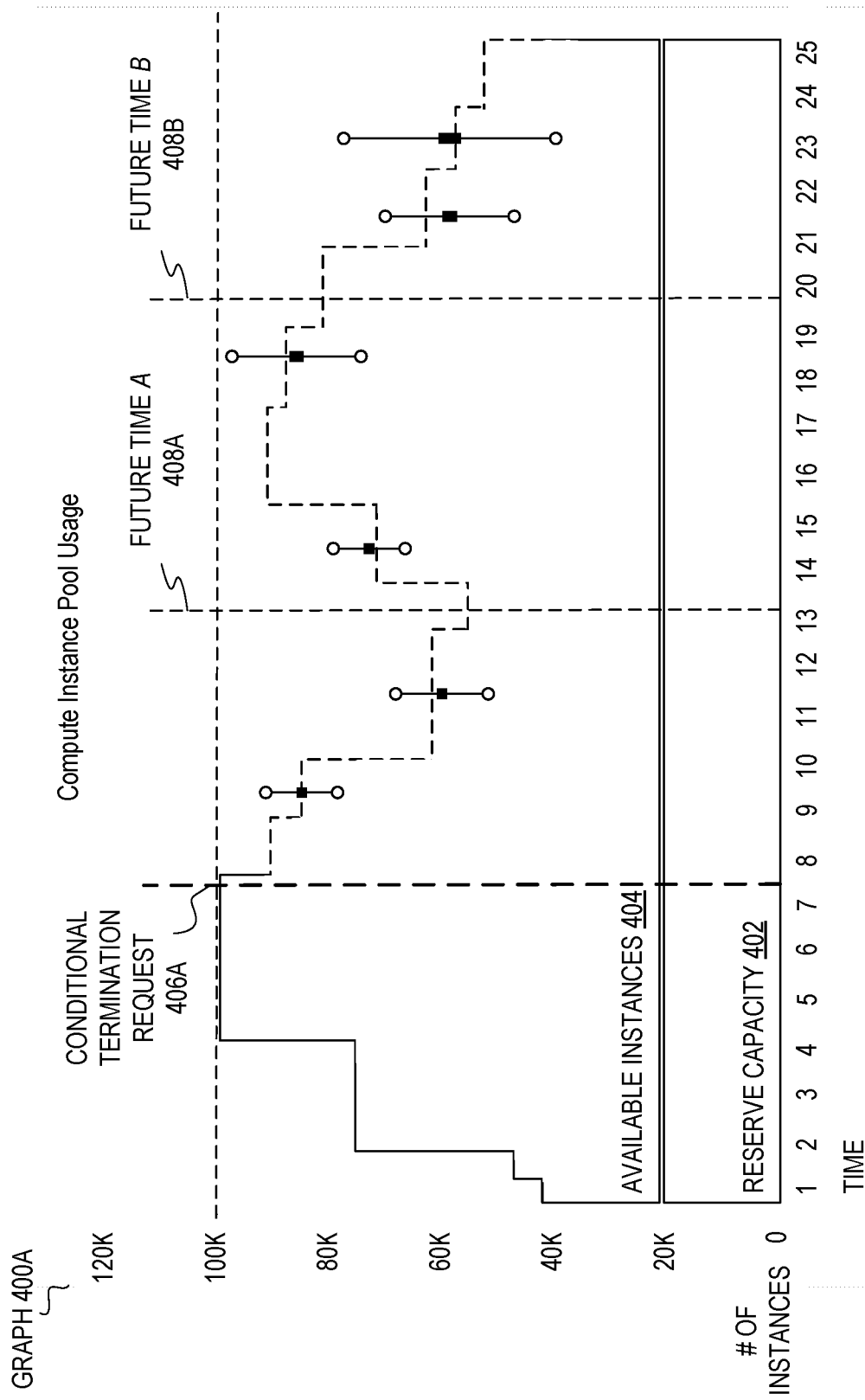
FIG. 4A is a diagram illustrating a conditional termination request and the predictiveness that a cloud provider network can provide at various future times according to some embodiments.

FIG. 4A is a diagram illustrating a conditional termination request and the predictiveness that a cloud provider network can provide at various future times. The graph 400A illustrated in FIG. 4A shows a number of available compute instances 404 in a capacity pool managed by a cloud provider network 100 in addition to an amount of reserve capacity 402. In the example of FIG. 4A, a conditional termination request 406A is generated at a point in time. FIG. 4A illustrates that a forecasted likelihood value may vary depending on whether the user requests replacement capacity at a future time 408A or 408B, which may be approximately 6 and 12 hours (or days, or any other unit of time) in the future, respectively. As shown, the forecasted capacity availability at future time 408A is less than the forecasted capacity availability at future time 408B. However, the forecast certainty at future time 408A may be significantly greater than that at future time 408B, depending on various factors described above. FIG. 4A further illustrates reserve capacity 402 that is not used under normal circumstances but may be used in some cases to satisfy reservation requests that were previously generated, if necessary.

Figure 4B:
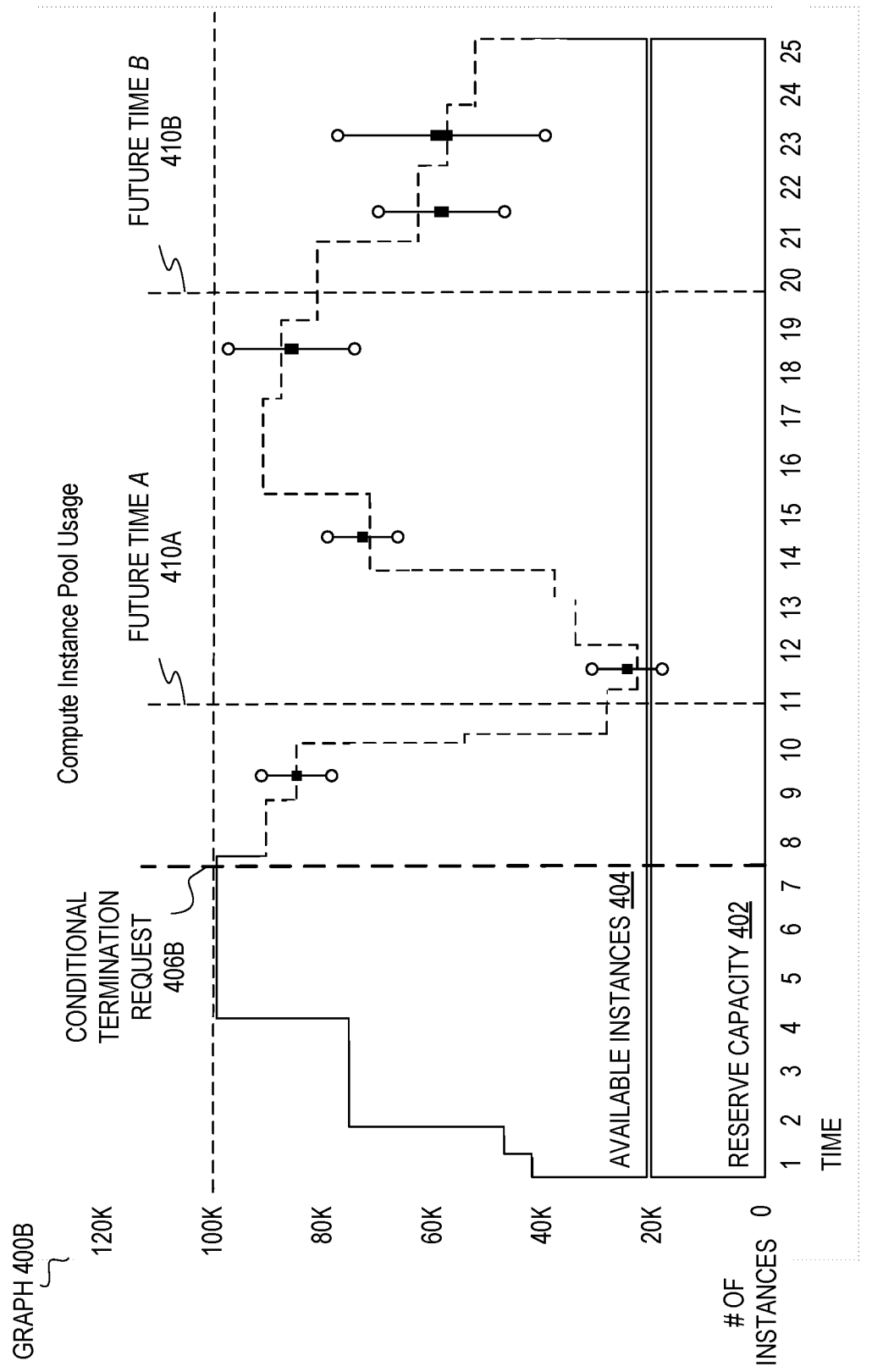
FIG. 4B is another diagram illustrating a conditional termination request for a computing resource that is part of a pool with greater capacity variability according to some embodiments.

FIG. 4B similarly is another diagram illustrating a conditional termination request for a computing resource that is part of a pool with greater capacity variability. As illustrated in FIG. 4B, a conditional termination request 406B may be denied if requested for a future time 410A as the number of available compute instances is predicted to be low immediately around the requested time. On the other hand, a conditional termination request 406B may be granted if requested for a future time 410B that is farther in the future but associated with a forecast of significantly more available capacity. As shown in FIGS. 4A and 4B, such forecasts may be associated with various margins of error at each point in time that can influence the forecasted likelihood generated for any particular conditional termination request.

In some embodiments, a capacity forecasting and scheduling service 138 can provide various GUIs that display information indicating historical capacity usage by the user's workloads and scheduled usage of capacity in the future, and further enable users to make modifications to proposed capacity schedules. For example, graph illustrated in FIG. 4B may be included as part of an interactive GUI that enables users to view and modify conditional termination requests and to obtain information about forecasted capacity availability likelihoods. An interface including the graph 400, for example, might enable users to slide the future time 408A and future time 408B bars to find a time or range of time in the future with sufficient capacity availability certainty such that conditional termination requests can be satisfied. The forecasted capacity graphs (e.g., illustrating a number of available compute instances or other virtual resources over time) can be generated in some implementations using a machine learning model, as described above.

Returning to FIG. 1, in some embodiments, at circle "6," a request to launch one or more new compute instances based on one or more capacity reservation identifiers obtained as described above is sent to the capacity forecasting and scheduling service 138 (or other component of the hardware virtualization service 102). For example, a user may again use a computing device to send the request via a web-based console or other interface, or another service of the service provider network 100 may generate the request. Assuming the hardware virtualization service 102 can satisfy the request to launch the reserved capacity, at circle "7," one or more new compute instances are launched and the capacity reservations are marked as fulfilled by the capacity forecasting and scheduling service 138. In some embodiments, in response to receiving a capacity reservation use request, if the hardware virtualization service 102 determines that sufficient capacity may not be available to satisfy the request, the service may use one or more instances from reserve capacity to satisfy the request.

Although many of the examples herein are described in the context of workloads executing using compute instances of a service provider network 100, in general, the techniques can be used in any computing environment and in connection with any type of computing resource, including computing resources running in service provider networks, on-premises environments, or combinations thereof. For example, a user's on-premises compute instances can collect and send utilization metrics to a data monitoring service of a service provider network 100, and capacity forecasting and scheduling service 138 of the service provider network or the user's on-premises environment can obtain the metrics from the data monitoring service and make conditional termination request decisions based on the obtained metrics.

Figure 5:
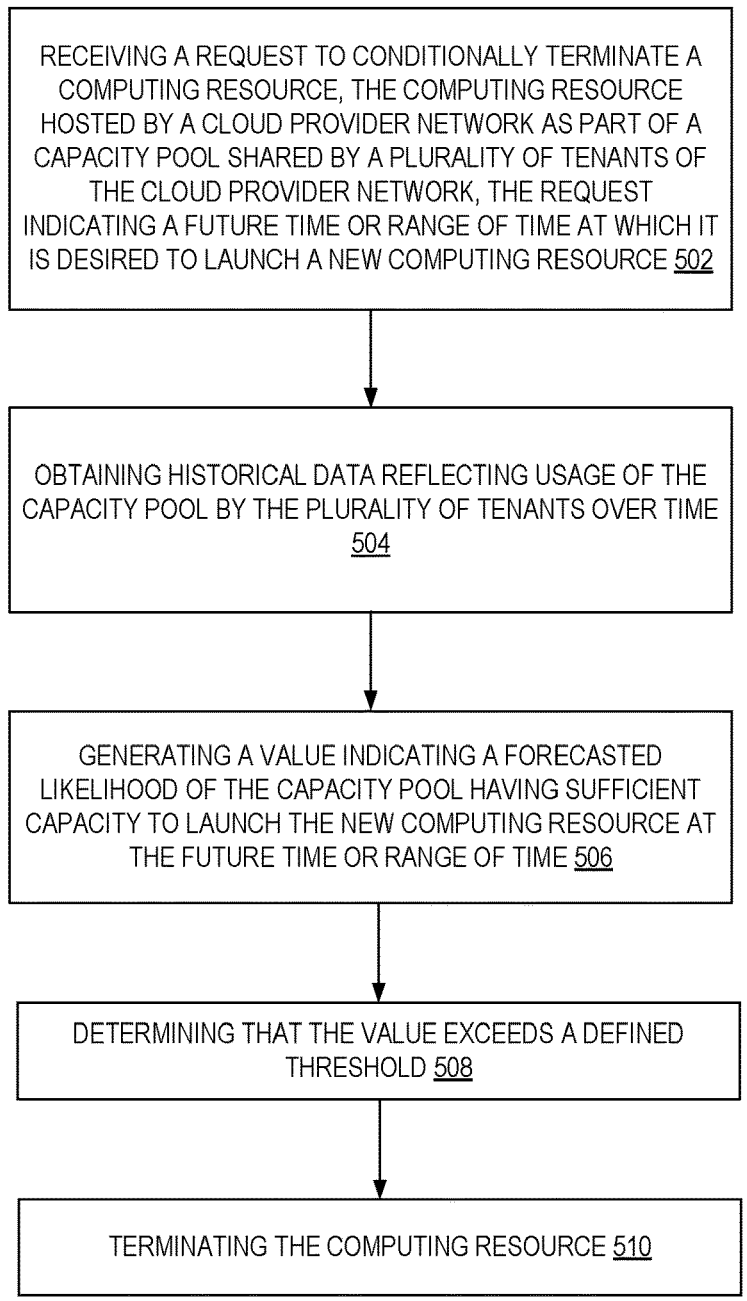
FIG. 5 is a flow diagram illustrating operations of a method for enabling requests to terminate computing resource capacity provided by a cloud provider network conditioned on a forecasted likelihood that replacement computing resource capacity will be available at a specified time or range of time in the future according to some embodiments.

FIG. 5 is a flow diagram illustrating operations of a method for enabling requests to terminate computing resource capacity provided by a cloud provider network conditioned on a forecasted likelihood that replacement computing resource capacity will be available at a specified time or range of time in the future according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a capacity forecasting and scheduling service 138 of the other figures.

The operations 500 include, at block 502, receiving a request to conditionally terminate a computing resource, the computing resource hosted by a cloud provider network as part of a capacity pool shared by a plurality of tenants of the cloud provider network, the request indicating a future time or range of time at which it is desired to launch a new computing resource.

The operations 500 further include, at block 504, obtaining historical data reflecting usage of the capacity pool by the plurality of tenants over time.

The operations 500 further include, at block 506, generating a value indicating a forecasted likelihood of the capacity pool having sufficient capacity to launch the new computing resource at the future time or range of time.

The operations 500 further include, at block 508, determining that the value exceeds a defined threshold. The threshold may be set by the cloud provider or the customer based on an acceptable risk of not having sufficient capacity to relaunch the instance.

The operations 500 further include, at block 510, terminating the computing resource.

Figure 6:
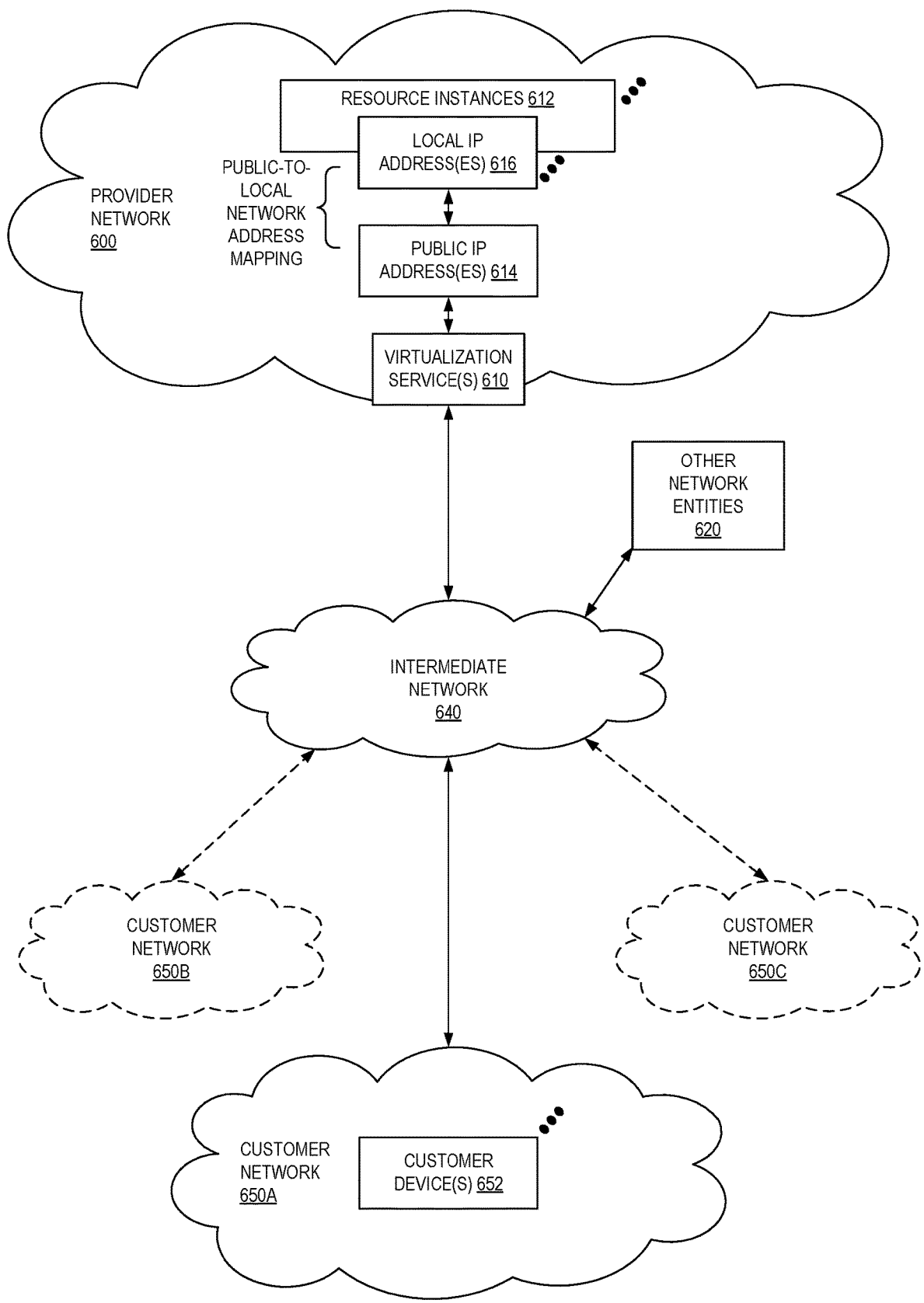
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
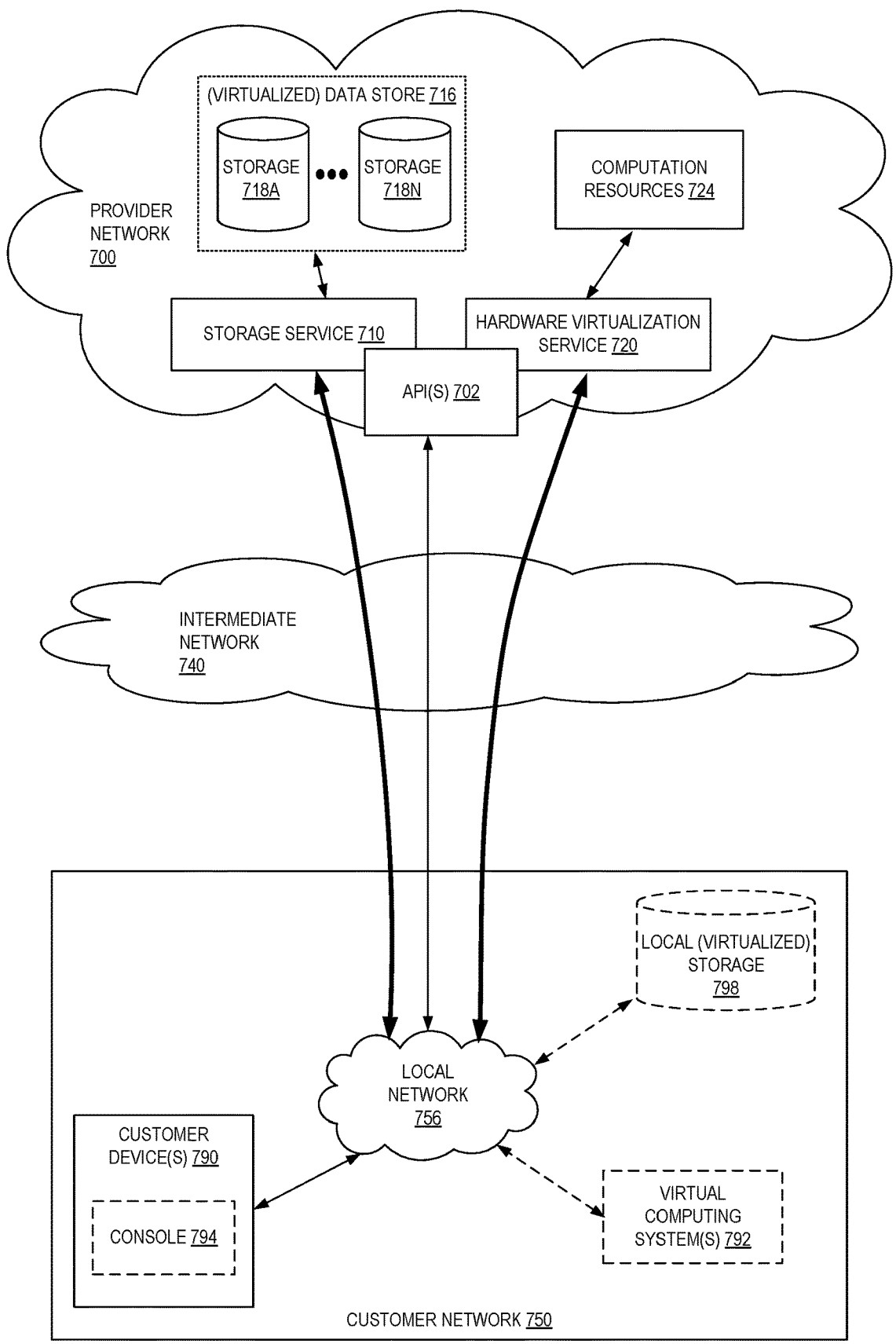
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
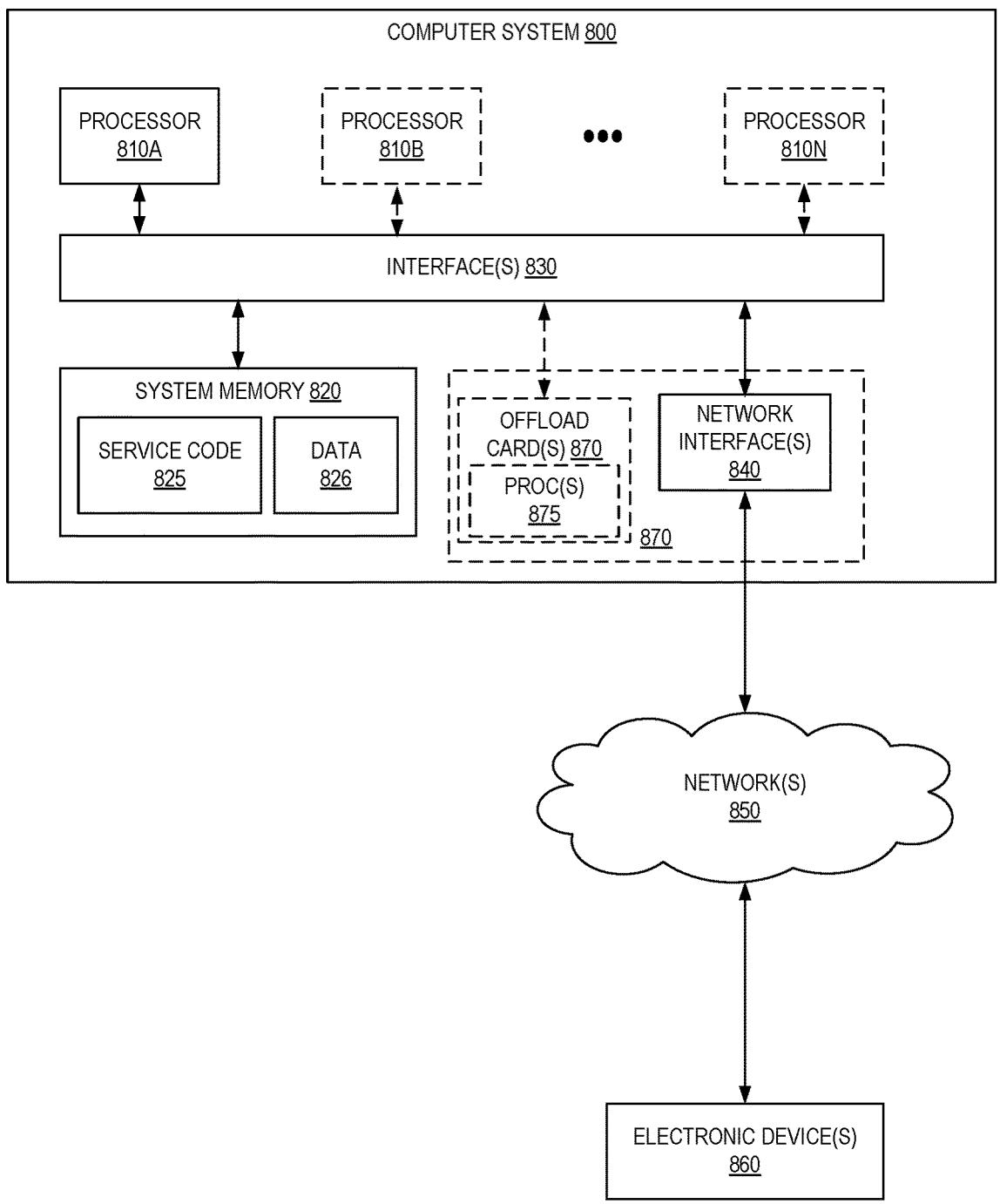
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). In some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a hardware virtualization service, an application programming interface (API) request to conditionally terminate a compute instance, the compute instance running as part of a compute instance capacity pool shared by a plurality of tenants of a cloud provider network, the request indicating a future time or range of time at which it is desired to launch a new compute instance to be used to replace the compute instance being terminated;
   obtaining historical data indicating a number of compute instances used by the plurality of tenants from the compute instance capacity pool over time;
   generating, based at least in part on the historical data, a value indicating a forecasted likelihood of the compute instance capacity pool having sufficient capacity available to launch the new compute instance at the future time or range of time;
   determining that the value exceeds a defined threshold; and
   responsive to receiving the API request to conditionally terminate the compute instance, terminating the compute instance.

2. The computer-implemented method of claim 1, further comprising:
   sending an identifier of a reservation to launch the new compute instance at the future time or range of time;
   receiving a request to launch the new compute instance at the future time or range of time, the request including the identifier of the reservation to launch the new compute instance; and
   launching the new compute instance.

3. The computer-implemented method of claim 1, wherein generating the value indicating the forecasted likelihood of the compute instance capacity pool having sufficient capacity available to launch the new compute instance at the future time is further based on at least one of: data indicating a current number of compute instances used by the plurality of tenants from the compute instance capacity pool, a variability of a number of compute instances used from the compute instance capacity pool over time, a number of current capacity reservations associated with the compute instance capacity pool, an amount of capacity to be added to the compute instance capacity pool at a future time, or an amount of capacity to be removed from the compute instance capacity pool at a future time.

4. A computer-implemented method comprising:
   receiving a request to conditionally terminate a computing resource, the computing resource hosted by a cloud provider network as part of a capacity pool shared by a plurality of tenants of the cloud provider network, the request indicating a future time or range of time at which it is desired to launch a new computing resource;
   obtaining historical data reflecting usage of the capacity pool by the plurality of tenants over time;
   generating a value indicating a forecasted likelihood of the capacity pool having sufficient capacity to launch the new computing resource at the future time or range of time;
   determining that the value exceeds a defined threshold; and
   responsive to receiving the request to conditionally terminate the computing resource, terminating the computing resource.

5. The computer-implemented method of claim 4, further comprising:
   sending an identifier of a reservation to launch the new computing resource at the future time or range of time;
   receiving a request to launch the new computing resource at the future time or range of time, the request including the identifier of the reservation to launch the new computing resource; and
   launching the new computing resource.

6. The computer-implemented method of claim 4, wherein generating the value indicating the forecasted likelihood of the capacity pool having sufficient capacity available to launch the new computing resource at the future time is further based on at least one of: data indicating a current number of computing resource used by the plurality of tenants from the capacity pool, a variability of a number of computing resource used from the capacity pool over time, a number of capacity reservations currently associated with the capacity pool, an amount of capacity to be added to the capacity pool at a future time, or an amount of capacity to be removed from the capacity pool at a future time.

7. The computer-implemented method of claim 4, wherein the request is a first request, the computing resource is a first computing resource, the future time or range of time is a first future time or range of time, the value is a first value, and wherein the method further comprises:
   receiving a second request to conditionally terminate a second computing resource, the request indicating a second future time or range of time at which it is desired to launch a new computing resource;

generating a second value indicating a forecasted likelihood of the capacity pool having sufficient capacity to launch the new computing resource at the second future time or range of time;

determining that the value does not exceed the defined threshold; and sending a response indicating that the request cannot be satisfied.

8. The computer-implemented method of claim 4, further comprising sending a response including the value indicating the forecasted likelihood of the capacity pool having sufficient capacity to launch the new computing resource at the future time or range of time.

9. The computer-implemented method of claim 4, wherein the request is generated by a service of the cloud provider network that manages an auto scaling group of which the computing resource is a member, and wherein the future time or range of time is based on an analysis of historical resource demand data reflecting use of computing resources by a workload associated with the computing resource.

10. The computer-implemented method of claim 4, wherein the capacity pool is one of a plurality of capacity pools managed by a hardware virtualization service of the cloud provider network.

11. The computer-implemented method of claim 4, wherein the computing resource is one of a plurality of computing resources requested to be conditionally terminated, and wherein the value indicates the forecasted likelihood of the capacity pool having sufficient capacity to launch a plurality of new computing resources at the future time or range of time.

12. The computer-implemented method of claim 4, further comprising causing display of a graphical user interface (GUI) including information about forecasted likelihoods of the capacity pool having sufficient capacity to launch a specified number of new computing resources at a plurality of future times or ranges of time.

13. The computer-implemented method of claim 4, wherein the historical data is first historical data, and wherein the method further comprises:

obtaining second historical data reflecting usage of a pool of computing resources by a workload with which the computing resource is associated;

analyzing the second historical data to determine that the workload is associated with a cyclical resource demand pattern; and causing display of a graphical user interface (GUI) including a suggestion to use conditional termination requests in association with the workload.

14. The computer-implemented method of claim 4, wherein the computing resource at least one of: a virtual machine (VM) instance, a container instance, a database instance, or a storage instance.

15. A system comprising:

a capacity forecasting and scheduling service implemented by a first one or more electronic devices, the capacity forecasting and scheduling service including first instructions that upon execution cause the capacity forecasting and scheduling service to:

receive a request to conditionally terminate a compute instance, the compute instance hosted by a cloud provider network as part of a capacity pool shared by a plurality of tenants of the cloud provider network, the request indicating a future time or range of time at which it is desired to launch a new compute instance; and obtain historical data reflecting usage of the capacity pool by the plurality of tenants over time;

generate a value indicating a forecasted likelihood of the capacity pool having sufficient capacity to launch the new compute instance at the future time or range of time;

determine that the value exceeds a defined threshold; and responsive to receiving the request to conditionally terminate the compute instance, send instructions to terminate the compute instance; and a hardware virtualization service implemented by a second one or more electronic devices, the hardware virtualization service including instructions that upon execution cause the hardware virtualization service to:

receive the instructions to terminate the compute instance; and terminate the compute instance.

16. The system of claim 15, wherein the first instructions upon execution further cause the capacity forecasting and scheduling service to:

send an identifier of a reservation to launch the new compute instance at the future time or range of time;

receive a request to launch the new compute instance at the future time or range of time, the request including the identifier of the reservation to launch the new compute instance; and send instructions to launch the new compute instance based on the identifier.

17. The system of claim 15, wherein generating the value indicating the forecasted likelihood of the capacity pool having sufficient capacity available to launch the new compute instance at the future time is further based on: data indicating a current number of compute instances used by the plurality of tenants from the capacity pool, a variability of a number of compute instances used from the capacity pool over time, and a number of current capacity reservations associated with the plurality of tenants.

18. The system of claim 15, wherein the request is a first request, the compute instance is a first compute instance, the future time or range of time is a first future time or range of time, the value is a first value, and wherein the first instructions upon execution further cause the capacity forecasting and scheduling service to:

receive a second request to conditionally terminate a second compute instance, the request indicating a second future time or range of time at which it is desired to launch a new compute instance;

generate a second value indicating a forecasted likelihood of the capacity pool having sufficient capacity to launch the new compute instance at the second future time or range of time;

determine that the value does not exceed the defined threshold; and send a response indicating that the request cannot be satisfied.

19. The system of claim 15, wherein the first instructions upon execution further cause the capacity forecasting and scheduling service to send a response including the value indicating the forecasted likelihood of the capacity pool having sufficient capacity to launch the new compute instance at the future time or range of time.

20. The system of claim 15, wherein the request is generated by a service of the cloud provider network that manages an auto scaling group of which the compute instance is a member.

* * * * *